(12) United States Patent
Jones

(10) Patent No.: US 6,929,369 B2
(45) Date of Patent: Aug. 16, 2005

(54) AUTOSTEREOSCOPIC DISPLAY

(75) Inventor: Graham Roger Jones, Oxfordshire (GB)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 10/662,262

(22) Filed: Sep. 15, 2003

(65) Prior Publication Data

US 2004/0057016 A1 Mar. 25, 2004

(30) Foreign Application Priority Data

Sep. 17, 2002 (GB) ............................................... 0221583

(51) Int. Cl.[7] ........................ G03B 21/00; G03B 27/22; H04N 13/00; H04N 15/00
(52) U.S. Cl. ............................. 353/10; 353/7; 359/463; 359/472; 359/478; 348/44; 348/58; 348/59
(58) Field of Search ................................. 353/10, 7, 38; 359/443, 454–455, 458, 462–464, 466, 472, 477, 478, 20; 348/42, 51–52, 54–55, 59, 44, 58; 349/15

(56) References Cited

U.S. PATENT DOCUMENTS 5,991,073 A * 11/1999 Woodgate et al. .......... 359/462
6,055,013 A * 4/2000 Woodgate et al. ............ 348/59
2003/0016444 A1 * 1/2003 Brown et al. ................ 359/462

FOREIGN PATENT DOCUMENTS

GB 2 252 175 A 7/1992
GB 2 321 815 A 8/1998

OTHER PUBLICATIONS

Search Report, Application No. GB 0221583.8, dated Feb. 20, 2003.

* cited by examiner

Primary Examiner—Judy Nguyen
Assistant Examiner—Rochelle Blackman
(74) Attorney, Agent, or Firm—Renner, Otto, Boisselle & Sklar, LLP

(57) ABSTRACT

An autostereoscopic display comprises an SLM which is controlled to provide an image display and a signal display. A parallax optic has a first portion which cooperates with the image display to form a plurality of viewing windows. A second portion of the parallax optic forms first and second images visible to an observer to allow the observer to distinguish between a desired orthoscopic viewing zone and undesirable viewing positions such as pseudoscopic positions. The pitch of parallax elements in the second portion is one and a half times the parallax element pitch in the first portion.

21 Claims, 16 Drawing Sheets

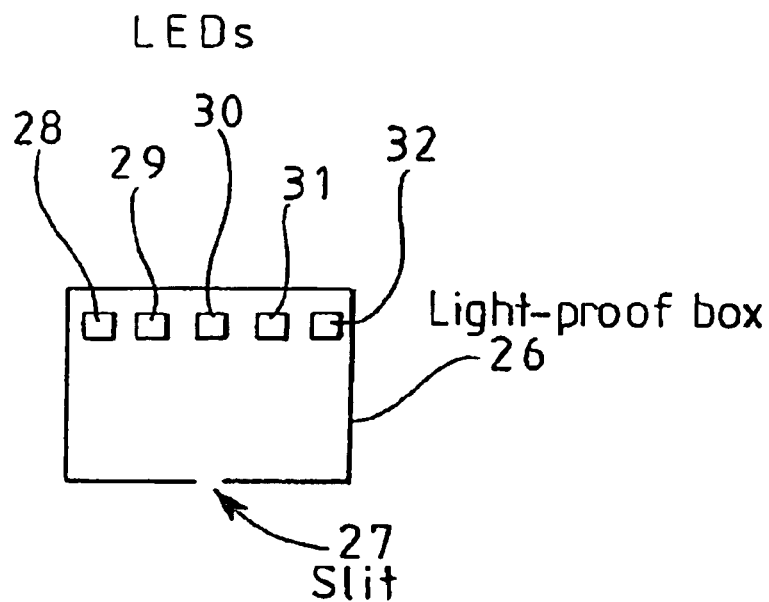
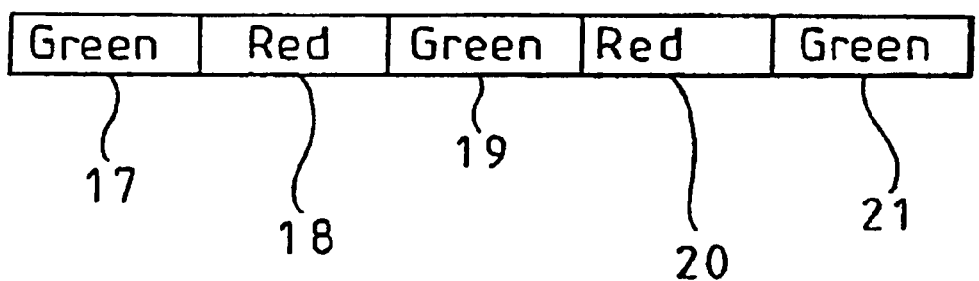
FIG 2
RELATED ART

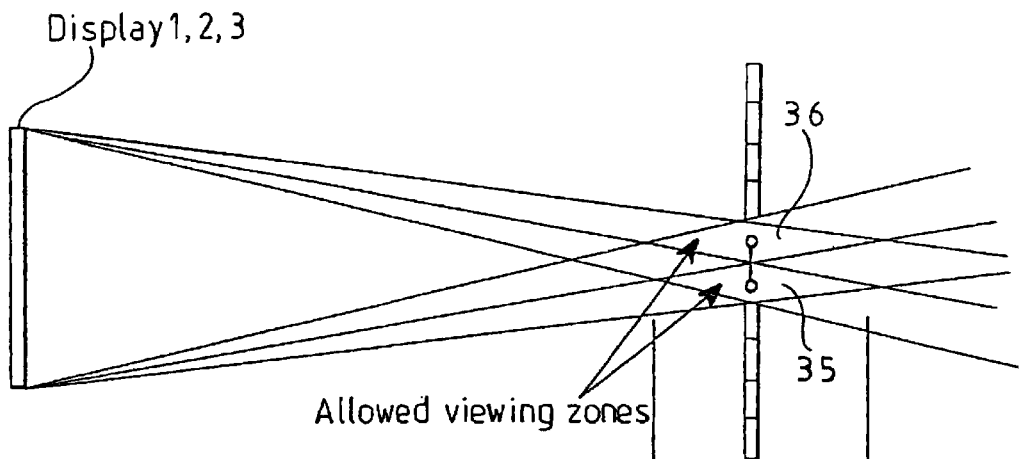
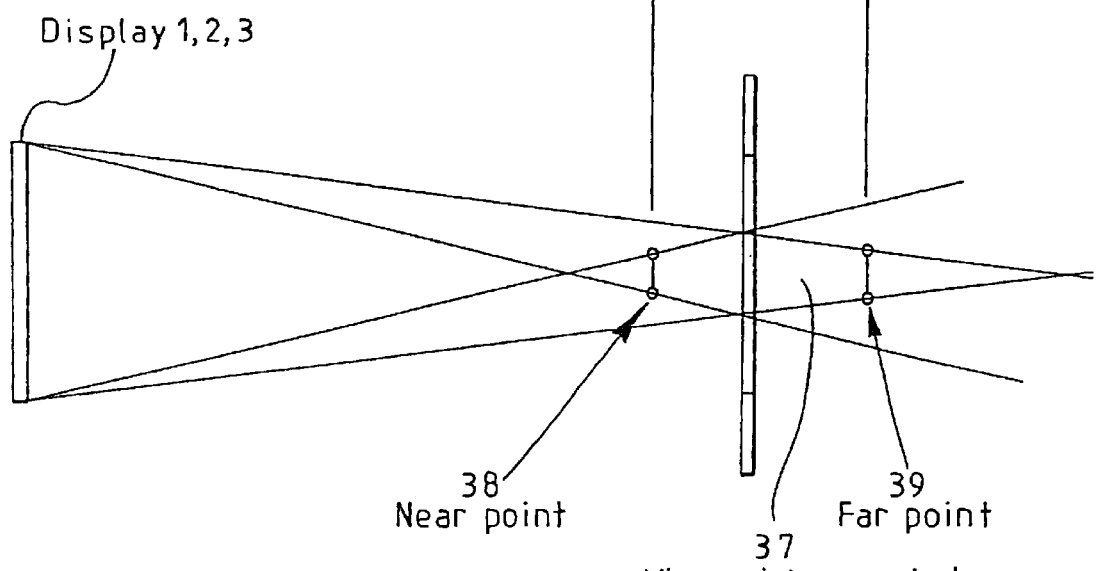
FIG 9

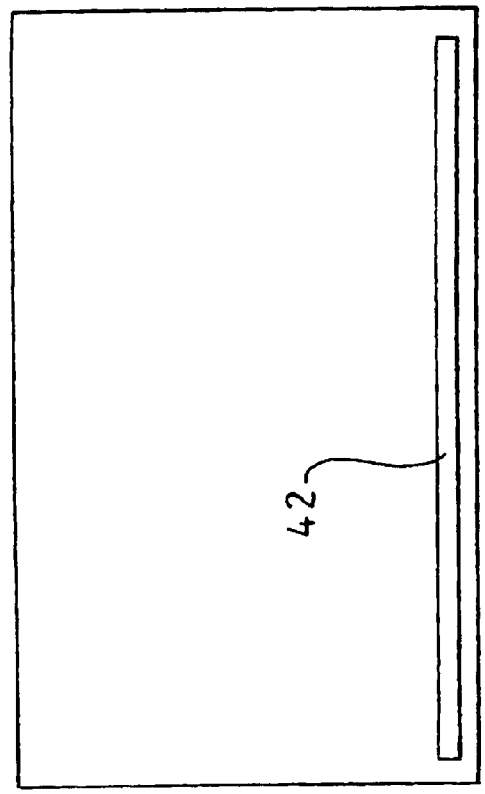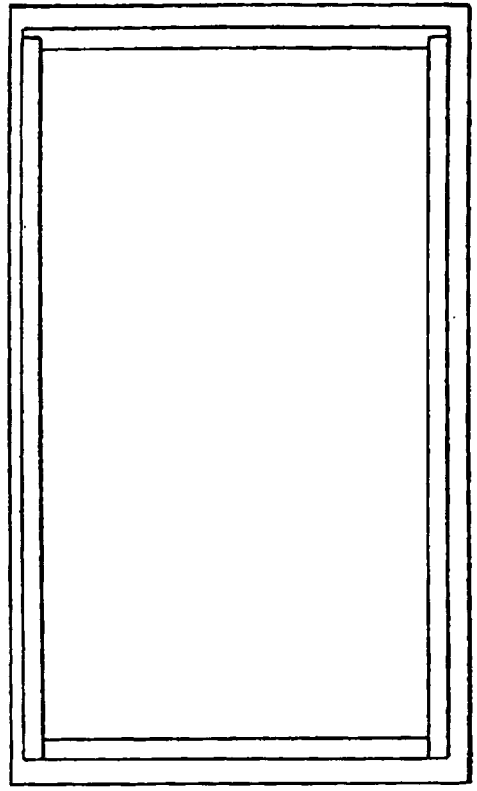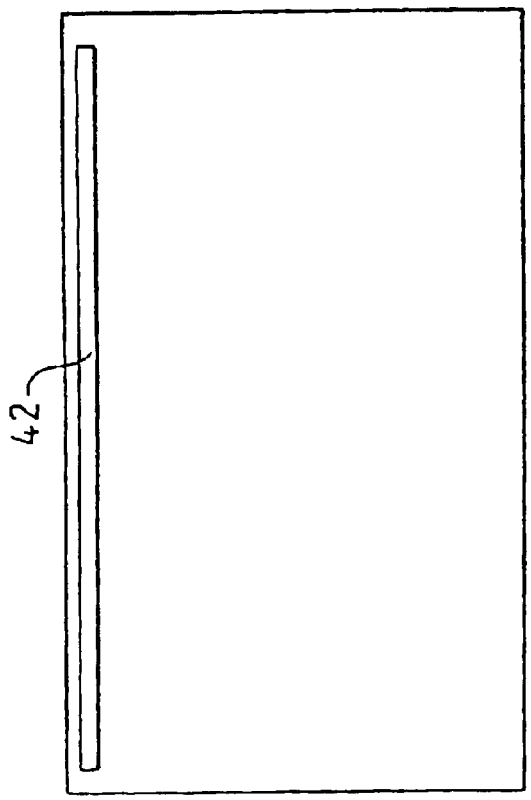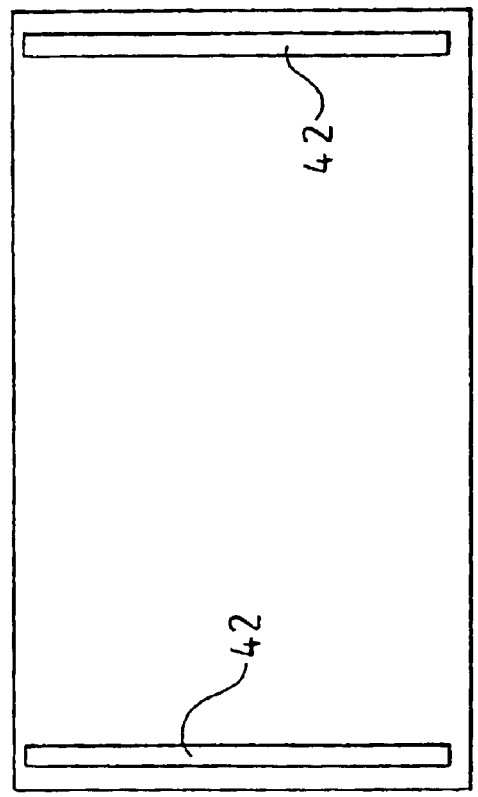
FIG. 10

3D Mode
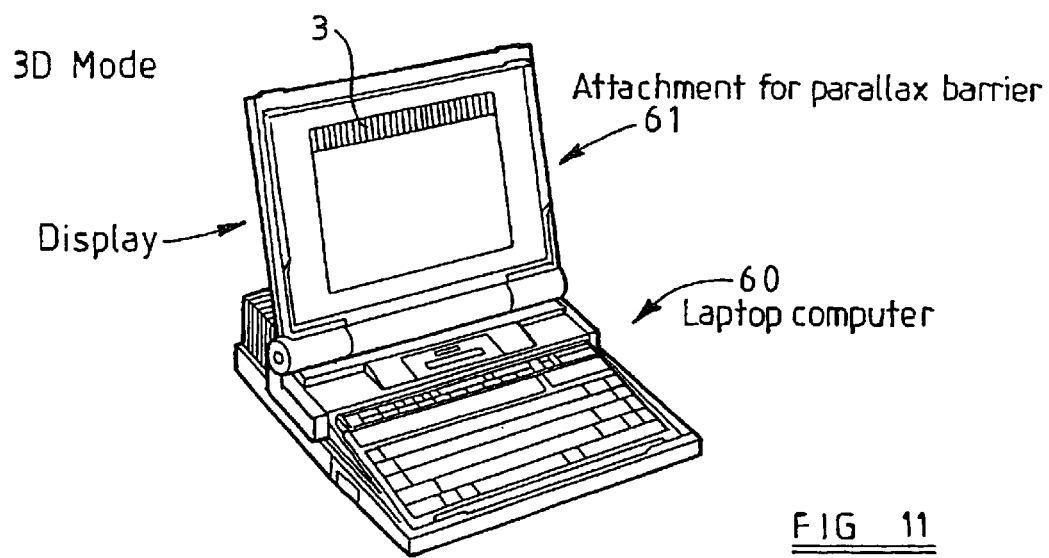
FIG 11
2D Mode
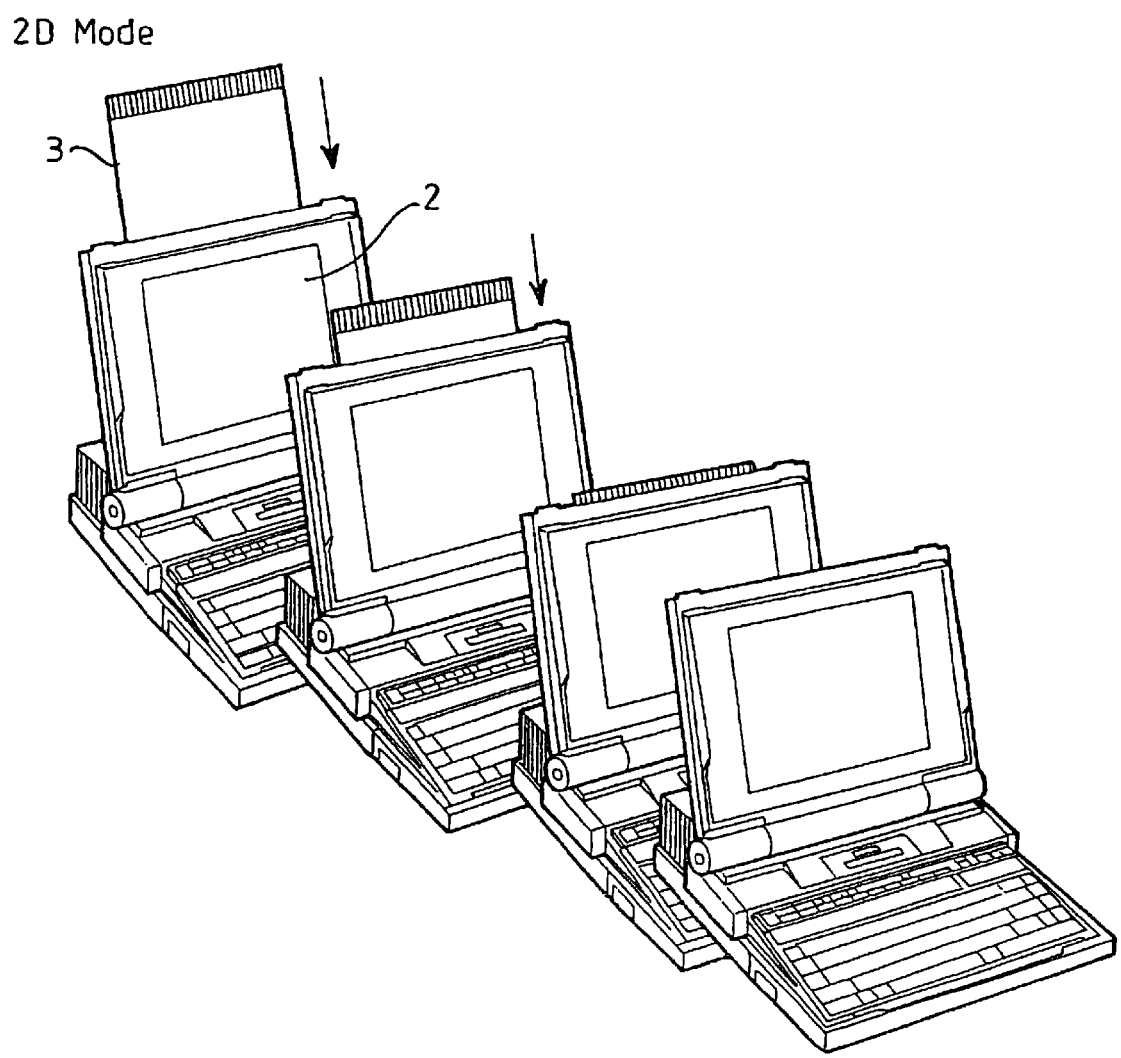

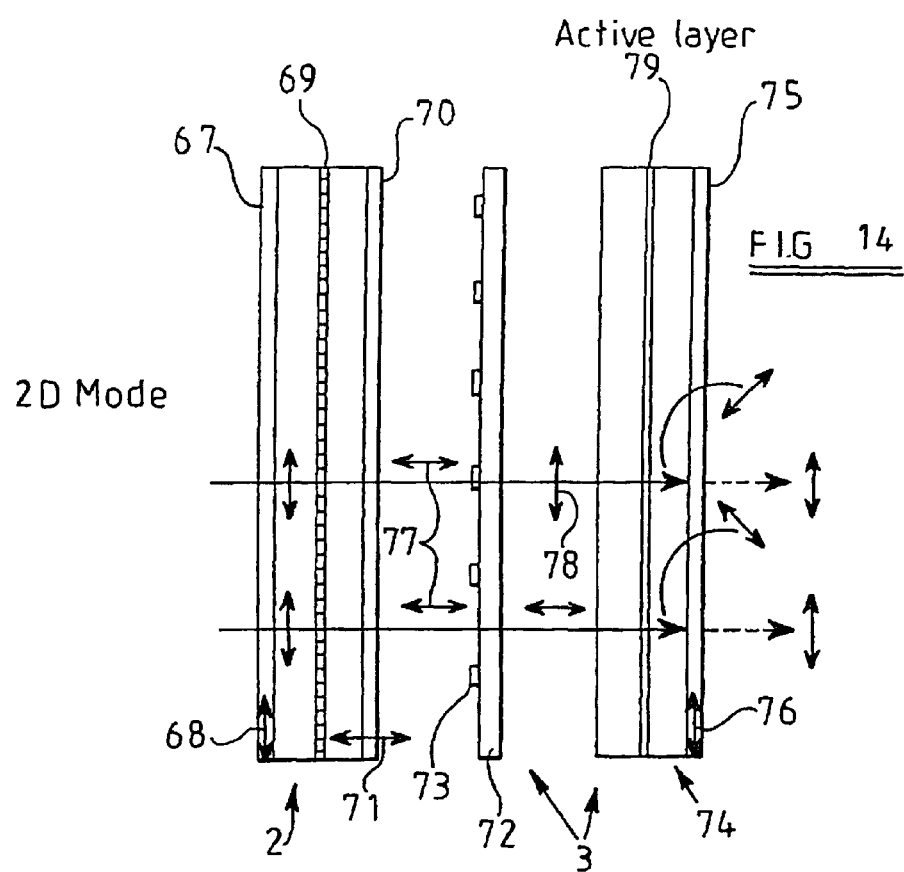

AUTOSTEREOSCOPIC DISPLAY

BACKGROUND OF THE INVENTION

1. Field of the Invention

The present invention relates to an autostereoscopic display. Such a display may comprise an autostereoscopic three dimensional (3D) display and maybe used, for instance, in 3D television, medical imaging, computer games, telephony, scientific visualisation, virtual reality and office automation equipment.

2. Description of the Related Art

A known type of autostereoscopic 3D display is shown in FIG. 1 of the accompanying drawings. The display comprises a diffuse back light 1 disposed behind a spatial light modulator (SLM) 2, for instance in the form of a liquid crystal display (LCD). The SLM 2 comprises an array of picture elements (pixels), for instance as disclosed in European Patent No. 0 625 861 in which the pixels are arranged in columns such that adjacent columns are substantially contiguous with each other in the lateral or horizontal direction.

A parallax optic 3, for instance in the form of a lenticular screen as illustrated diagrammatically in FIG. 1, is disposed in front of the SLM 2. Each parallax element 6 of the parallax optic 3 is aligned with a respective pair of pixel columns of the SLM 2. The pixel columns are controlled so as to display alternating vertical strips of left and right two dimensional (2D) images for the left and right eyes, respectively, of an observer. For instance, the pixel indicated at 4 displays an element of a left eye image whereas the pixel indicated at 5 displays an element of a right eye image.

Light from the columns including the pixels 4 and 5 is imaged by the associated parallax element 6 in a first lobe 7. Light from adjacent pixel columns indicated at 8 and 9 is imaged by the parallax element 6 into adjacent lobes 10 and 11, respectively. Further, light from the next columns indicated at 12 and 13 is imaged by the parallax element 6 into the further lobes 14 and 15.

In order to provide a viewpoint corrected display such that each eye of an observer sees the same image across the whole of the display, the pitch of the parallax elements of the parallax optic 3 is slightly less than twice the pitch of the pixel columns of the SLM 2. Alternatively the parallax optic may be disposed between the diffuse backlight 1 and the SLM 2, in which case the pitch of the parallax elements of the parallax optic should be slightly greater than twice the pixel column pitch.

This creates viewing zones which are repeated in several lobes. Provided the left and right eyes of an observer are located in the left and right viewing zones, respectively, of one of the lobes, the left eye sees only the 2D image intended for viewing by the left eye and the right eye sees only the 2D image intended for viewing by the right eye across the whole of the display. The widest parts of the viewing zones are referred to as viewing windows and are located in a common plane as indicated at 16. The viewing windows 16 are formed at the intended viewing distance from the display.

Provided the left and right eyes of an observer remain in the left and right eye viewing zones, respectively, the observer views the display orthoscopically and sees the correct 3D image. Such viewing zones may be referred to as orthoscopic viewing zones and viewing window positions for orthoscopic viewing are indicated at 17 to 21. However, if the left and right eyes of the observer are located in right and left viewing zones, respectively, the observer sees a pseudoscopic image. Pseudoscopic viewing window positions are indicated at 22 to 25 in FIG. 1. Pseudoscopic images create problems because they often appear to have some depth despite the depth information being misleading or false. It is not, therefore, always obvious that the observer is in the wrong location. Further, pseudoscopic viewing is known to cause headaches and other symptoms of visual strain.

Further, as the viewer moves laterally, the eyes may move to a position where the content viewed by, for example, the right eye, contains a significant portion of the left eye lobe. This again leads to a non-ideal view position which is known to cause headaches and other symptoms of visual strain.

"Proceedings of Third International Display Workshop", volume 2, Nov. 27–29, 1996 E. Nakayama et al, 1996 International Conference Centre, Kobe, Japan discloses a 3D indication for assisting an observer to find the proper viewing region of an autostereoscopic 3D display of the type shown in FIG. 1 of the accompanying drawings. The indicator is shown in FIG. 2 of the accompanying drawings and comprises a light-proof box 26 having a front slit 27 and containing light emitting diodes (LED) 28 to 32. The LEDs 28, 30 and 32 emit green light whereas the LEDs 29 and 31 emit red light. The size of the slit 27 and the geometry of the LEDs 28 to 32 with respect to the slit 27 are such that, when the eyes of the observer are located in the orthoscopic positions 17 to 21, light from the LEDs 32 to 28, respectively, can be seen through the slit 27. Thus, when the observer's eyes are in one of the orthoscopic positions 17 to 21, either only a green LED or only a red LED is visible. When the observer moves away from the orthoscopic positions, light from both a green LED and a red LED becomes visible. The observer must therefore position himself so that he can see only light of a single colour through the slit 27 of the indicator.

The indicator is made as a separate device from the autostereoscopic display and therefore requires correct alignment during manufacture in order to ensure that the regions where only a single colour is visible align correctly with the orthoscopic positions within the viewing windows. Such alignment is time-consuming and troublesome and therefore substantially adds to the cost and complexity of manufacture. Further, the optical system of the indicator is different from the optical system of the display itself. Thus, the indicator only provides correct identification of orthoscopic viewing positions at and very close to the plane containing the viewing windows. If the observer moves significantly outside this plane, the indicator no longer provides a correct indication of whether the observer is in an orthoscopic or non-orthoscopic position. Also, because of differences between the optical system of the indicator and the optical system of the display, the indicator provides an indication which is independent of the performance of the display optical system. Thus, even if the indicator is correctly aligned with the display, an observer may receive a false indication of being in an orthoscopic position when, in fact, imperfections in the display optical system are such that the observer is in an inappropriate viewing position.

GB 2 252 175 discloses an autostereoscopic display of the parallax barrier type. When a viewer moves out of the orthoscopic viewing region, the image which is visible to the viewer changes. Lateral movements causes the perceived image to darken whereas longitudinal movement results in vertical stripes being superimposed on the image. These image changes result from the parallax barrier structure of the display.

WO 94/24601 also discloses an autostereoscopic display in which the perceived image changes when the viewer moves outside the orthoscopic viewing region. In this case, the perceived image becomes monoscopic immediately the viewer leaves the orthoscopic viewing zone so as to avoid pseudoscopic viewing.

EP 0 860 728 and GB 2 321 815 disclose an autostereoscopic 3D display, as shown in FIGS. 3 and 4 of the accompanying drawings, which differs from that shown in FIG. 1 in that it includes a viewer position indicator (VPI) arrangement shown in FIG. 4. This arrangement comprises part of the backlight 1, part of the SLM 2 and part of the parallax optic 3. As shown in FIG. 3, the SLM 2 has an image portion 2a for displaying two 2D stereoscopic images as interlaced vertical strips on alternating columns of pixels with each parallax element 6 being optically aligned with an adjacent pair of pixel columns. Left and right viewing zones are formed in the lobes 7, 10, 11, 14 and 15 but only the orthoscopic viewing positions 17, 19 and 21 are intended for use by an observer. Thus, the orthoscopic positions 18 and 20 shown in FIG. 1 are not intended for use.

The viewer position indicator arrangement is formed by an upper strip of the backlight 1, a signalling portion 2b comprising one or more upper rows of pixels of the SLM 2, and a upper portion 3a of the parallax optic 3. The pixels shown in FIG. 4 are operated in horizontal pairs so as to act as pixels such as 30 and 31 having twice the horizontal extent and twice the pitch of the pixels shown in FIG. 3 and used for displaying the stereoscopic image. The upper portion 3a of the parallax optic 3 comprises a portion whose parallax elements 32 have twice the horizontal pitch of the parallax elements 6 shown in FIG. 3. Pixels such as 30 (shown unshaded) are controlled so as to provide a bright image and alternate laterally with pixels such as 31 (shown shaded) which are controlled so as to provide a dark image. In particular, the pixels 30 are substantially transparent whereas the pixels 31 are substantially opaque.

Each parallax element 32 is aligned with a respective parallax element 6. The pixels 30 and 31 and the parallax elements 32 cooperate to provide a bright image in the lobes 10 and 11 and a dark image in the lobes 7, 14 and 15. Thus, when an observer is located at the orthoscopic positions 17, 19 and 21 in the viewing windows 16, the viewer position indicating arrangement appears dark. As the observer moves from an orthoscopic position such as 19 to a pseudoscopic position such as 23, light from the viewer position indicating arrangement becomes visible, for instance to the right eye of the observer, thus indicating to the observer that he has moved from an orthoscopic position to a pseudoscopic position. If just one eye sees light from the viewer position indicating arrangement, the brain registers this as image data. The display does not, therefore, require both eyes of the observer to see light from the arrangement in order to work. Thus, provided the observer moves to a position where no light is visible from the viewer position indicating arrangement, he will remain in an orthoscopic position such as those indicated at 17, 19 and 21.

SUMMARY OF THE INVENTION

According to the present invention, there is provided an autostereoscopic display comprising an image display, a signal display, and a parallax optic having a first portion, which cooperates with the image display to form a plurality of right and left eye viewing zones in a viewing region, and a second portion, which cooperates with the signal display to form a first signal image which is visible in at least one first part of the viewing region and second signal image which is visible in at least one second part of the viewing region, the first portion comprising an array of parallax elements having a first pitch in a first direction, and the second portion comprising an array of parallax elements having a second pitch substantially equal to one and a half times the first pitch in the first direction.

It is thus possible to provide an arrangement which allows an observer to determine his position with respect to an autostereoscopic display irrespective of the actual images being displayed. In particular, by viewing the first and second signal images, the observer can determine whether he is in a first or second part of the viewing region. The indication has a higher spatial frequency than that provided by the indication in EP 0 860 728 so that the indication pattern is less visible. In the case of a display mechanically or electrically switchable between a 3D mode and a 2D mode, any residual visibility of the indication pattern in 2D mode will also be reduced. For a pixellated display, more pixels are used to provide the indication so that a brighter indication can be provided.

The at least one first part may comprise an orthoscopic viewing zone. The at least one second part may comprise pseudoscopic viewing zones adjacent the orthoscopic viewing zone. It is thus possible for the observer to determine whether he is located in the orthoscopic viewing region.

The first and second signal images may differ in various ways. For instance, one of the first and second signal images may be a bright image and the other of the first and second images may be a dark image. In another example, the first signal image may be a first colour and the second signal image may be a second colour different from the first colour.

By using a parallax optic having the first and second portions, alignment is automatically provided during manufacture of the parallax optic. Further, the image display and the signal display may comprise first and second portions, respectively, of a common display. Alignment of the first and second portions may therefore be achieved during manufacture so that no adjustments to achieve alignment are necessary during assembly of the autostereoscopic display.

The common display may be embodied in various ways. For instance, the common display may comprise a light-transmissive or trans-reflective spatial light modulator, such as a liquid crystal device, and a light source. The invention may be used on a transmissive or trans-reflective liquid crystal display device.

As an alternative, the common display may comprise a light emitting display.

The image display and the first portion may cooperate to form viewing zones in a plurality of lobes with two viewing zones per lobe. By minimising the number of viewing zones per lobe, improved 3D image resolution and possibly increased brightness may be achieved.

The parallax optic may be embodied in various ways. For instance, the parallax optic may comprise a lens array, such as a lenticular screen. As an alternative, the parallax optic may comprise an array of holographic optical elements. As a further alternative, the parallax optic may comprise a parallax barrier. The first portion of the parallax barrier may comprise a plurality of slits of a first width and the second portion of the parallax barrier may comprise a plurality of slits of the first width. As an alternative, the first portion of the parallax barrier may comprise a plurality of slits of first width and the second portion of the parallax barrier may comprise a plurality of slits of a second width less than the first width.

Alternate parallax elements of the second portion may be aligned in a second direction substantially perpendicular to the first direction with respective parallax elements of the first portion.

The parallax optic may be removable (e.g. mechanically) for a non-autostereoscopic display mode. Such an arrangement may be used to provide a full resolution 2D viewing mode. Alternatively, the parallax optic may be electronically switchable to a 2D mode, for instance as disclosed in EP 0 833 183. Such an electronically switchable parallax barrier may be arranged to switch viewer position indication on or off so that more of the display may be used for displaying a 3D image when viewer position indication is not required.

Where the parallax optic is embodied as a parallax barrier, the parallax barrier may comprise a first layer and a removable second layer, the first layer comprising barrier regions for passing light having a first polarisation and aperture regions for supplying at least light having a second polarisation which is substantially orthogonal to the first polarisation, the second layer comprising a polariser for passing light of the second polarisation. The second layer acts as an output polariser which absorbs light of the first polarisation and transmits light of the second polarisation when the display is in its 3D mode. The first layer may be fixed in correct registration with respect to the remainder of the autostereoscopic display. Switching between autostereoscopic and non-autostereoscopic modes can be achieved by removing and replacing the second layer, which requires only angular registration with respect to the rest of the display, thus reducing the tolerancing requirements so that difficulties with aligning a moveable element can be reduced or avoided.

The image display and the signal display may be arranged to supply light of the first polarisation, the barrier regions may be arranged to pass light of the first polarisation, and the aperture regions may be arranged to convert light of the first polarisation at least partially to light of the second polarisation. The first layer may be a half waveplate, the barrier regions may have optic axes parallel to the first polarisation and the aperture regions may have optic axes aligned at 45° to the first polarisation. By avoiding the use of devices such as polarisation rotators in the barrier regions, suppression of light from the barrier regions can be maximised across the visible spectrum. This allows cross-talk between views to be minimised.

The signal display may be arranged to be active throughout a lateral extent corresponding to the lateral extent of the or each three dimensional image displayed by the image display. Such an arrangement allows the longitudinal viewing freedom of the display to be optimally indicated.

BRIEF DESCRIPTION OF THE DRAWINGS

The invention will be further described, by way of example, with reference to the accompanying drawings, in which:

FIG. 2 is a diagrammatic cross-sectional view on a horizontal sectional plane of a known observer position indicator;

FIG. 9 is a plan view illustrating viewing zone formation;

FIG. 10 illustrates possible sensor locations for an autostereoscopic 3D display of the type shown in FIGS. 3 and 4;

FIG. 11 illustrates a laptop computer including a display of the type shown in FIGS. 3 and 5 with a removable parallax barrier;

FIGS. 13 and 14 are diagrammatic cross-sectional views of a third arrangement operating in 3D and 2D modes;

Like reference numerals refer to like parts throughout the drawings.

DESCRIPTION OF THE PREFERRED EMBODIMENTS

Figure 1:
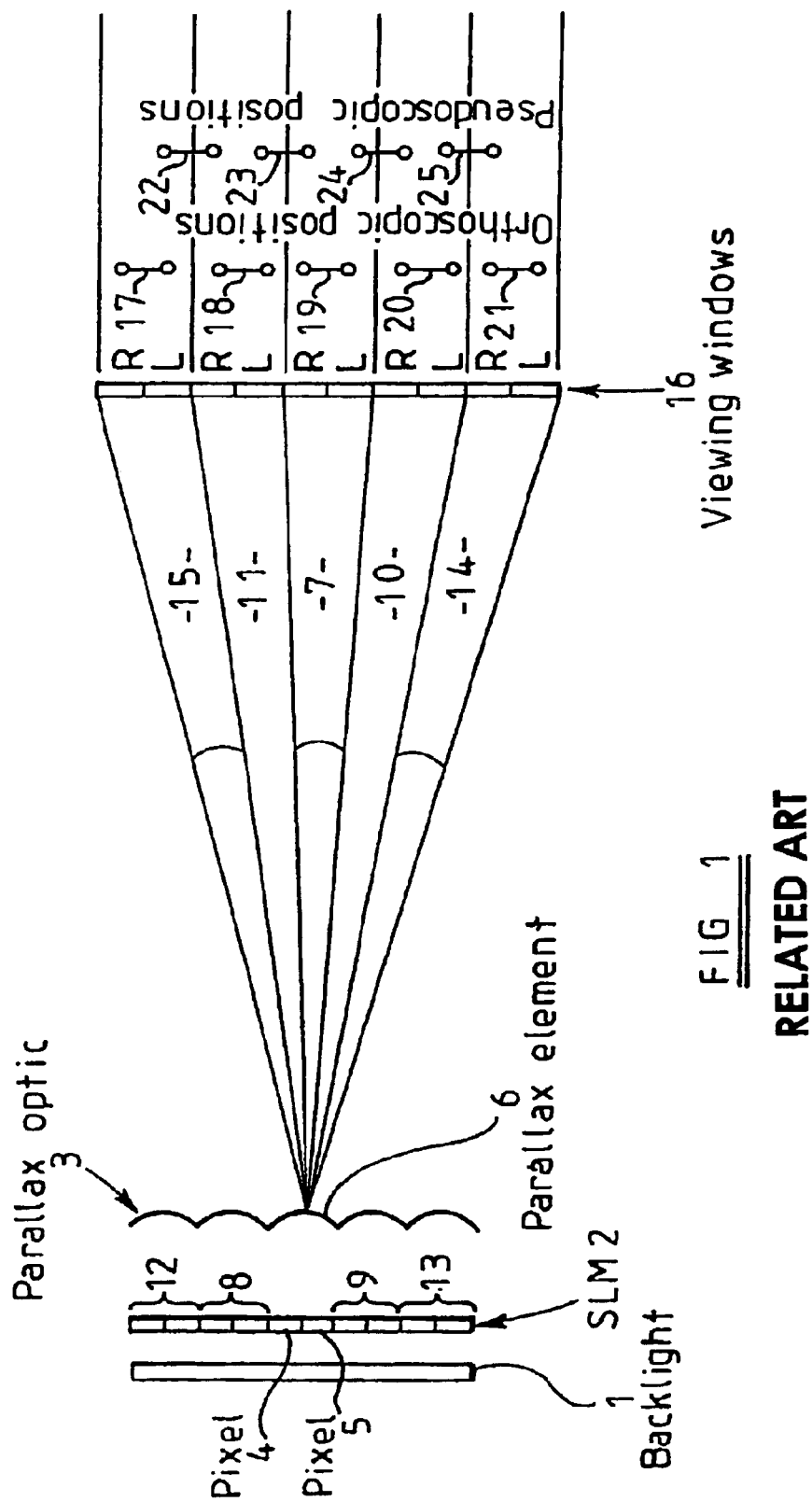
FIG. 1 is a diagrammatic cross-sectional view on a horizontal sectional plane of a known autostereoscopic 3D display.
Figure 3:
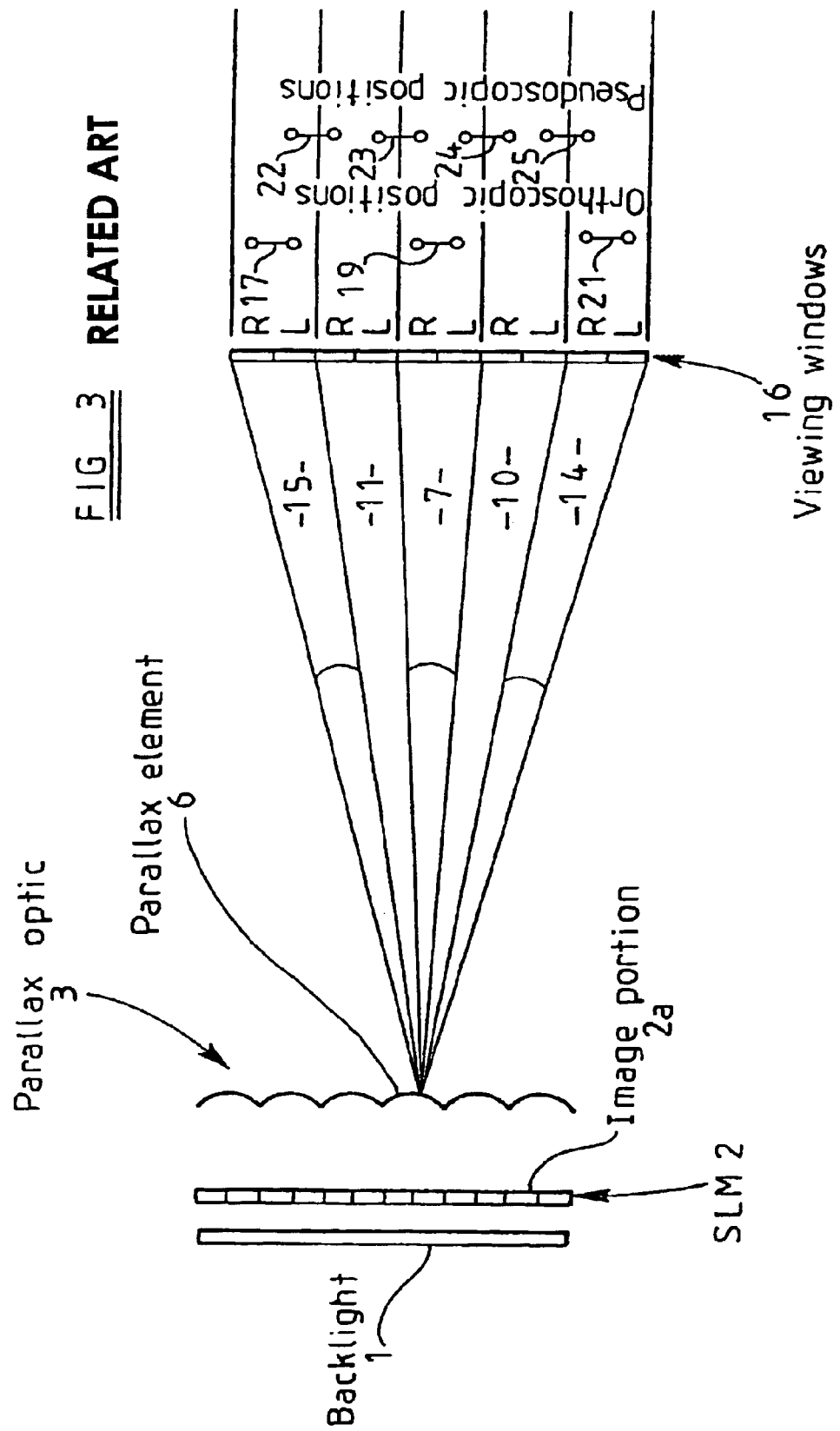
FIGS. 3 and 4 are diagrammatic cross-sectional views on horizontal sectional planes at different heights of another known autostereoscopic 3D display.
Figure 4:
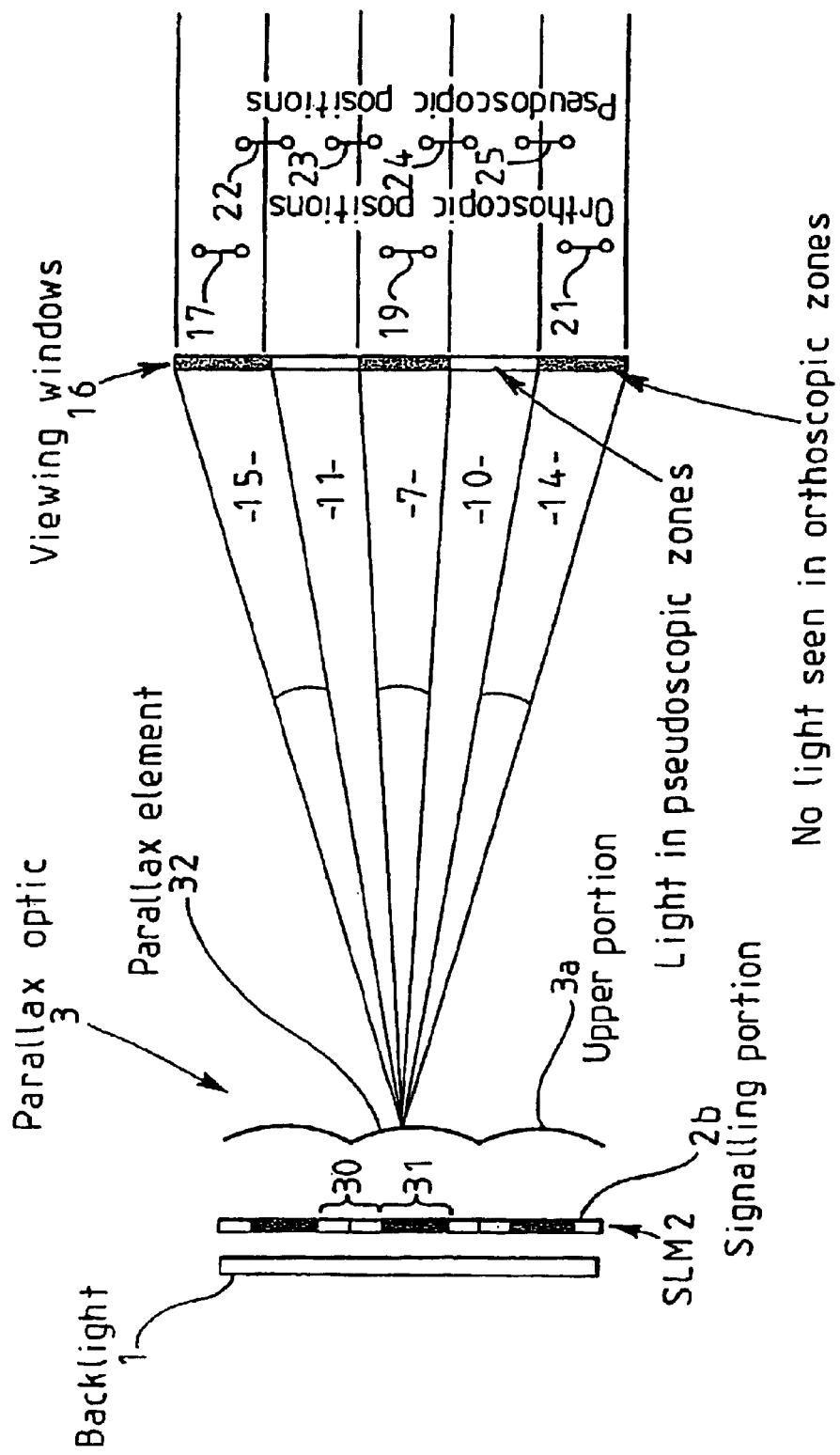
Figure 5:
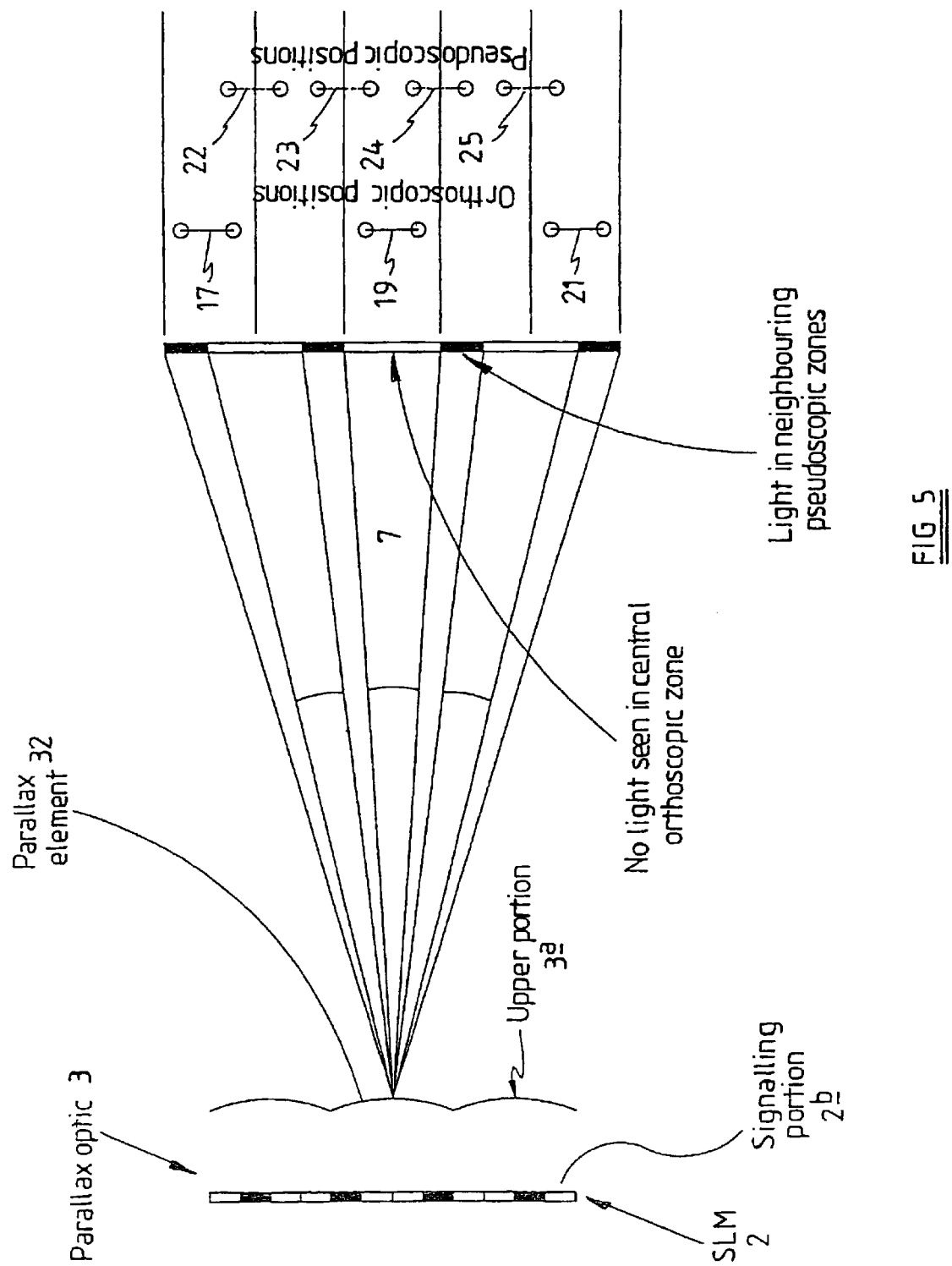
FIG. 5 is a diagrammatic cross-sectional view on a horizontal sectional plane of part of an autostereoscopic 3D display constituting an embodiment of the invention.

FIG. 5 illustrates the VPI part of an autostereoscopic display which differs from that shown in FIGS. 3 and 4 in that the pitch of the parallax elements 32 of the upper portion 3a of the parallax optic 3 is equal to one and a half times the pitch of the parallax elements 6 of the part of the parallax optic 3 which forms the viewing zones shown in FIG. 3. This contrasts with the pitch of the elements 32 in FIG. 4, which is twice that of the pitch of the elements 6 in FIG. 3.

Figure 6:
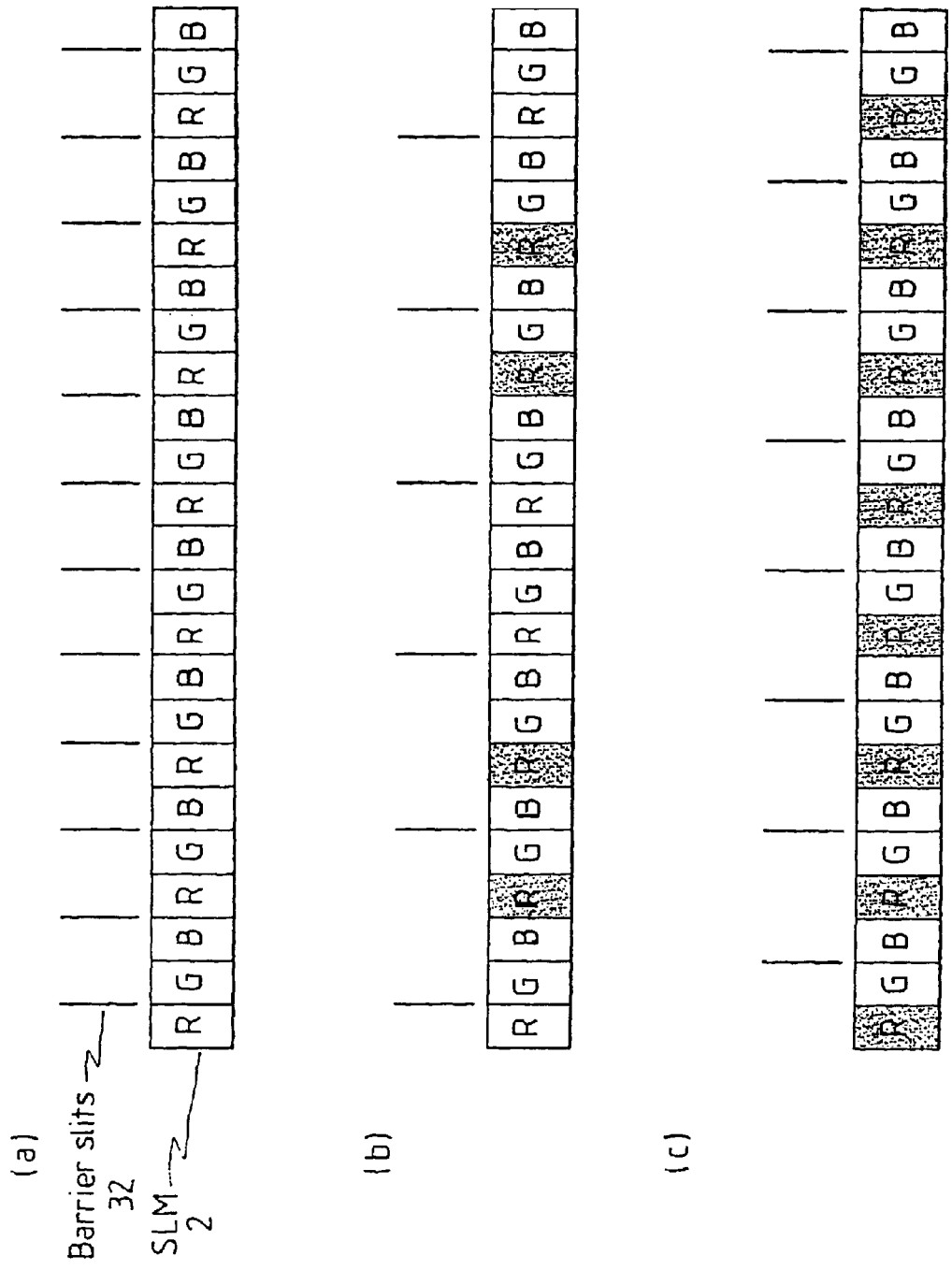
FIG. 6 is a diagram illustrating the parallax element/pixel relationships of FIGS. 3, 4 and 5.

This is illustrated diagrammatically in FIG. 6 for a parallax optic in the form of a parallax barrier. The lateral positions of barrier slits 32 and pixels of the SLM 2 are illustrated at (a) for the image displaying and generating portion of the display, at (b) for the VPI shown in FIG. 4, and at (c) for the VPI shown in FIG. 5. In (b) and (c), those red pixels which cooperate with the slits of the VPI portion of the barrier to provide the usual indication to the observer are shaded. Thus, in FIG. 6(c), every third pixel across the display is illuminated to provide the position indication and the colour filter pattern is such that all of these pixels are red. Thus, when an observer is away from the central orthoscopic viewing region 19, the display provides a red indication which is visible to the observer.

The display is intended to be viewed from the central orthoscopic viewing region 19 with the observer viewing the display normally with respect to a central region of the display. Adjacent the central orthoscopic viewing regions are the two pseudoscopic regions 23 and 24. If an observer moves into these pseudoscopic regions, he will see the indication from the VPI and will know that he is in an incorrect position for viewing the display.

As in the case of the display shown in FIGS. 3 and 4, use of the orthoscopic regions 18 and 20 is sacrificed in order to provide a clear indication to the user when he is in a correct orthoscopic viewing region. When in the regions 18 and 20, the observer sees the indication from the VPI informing him that he is in an incorrect viewing region.

In the arrangement shown in FIG. 5, no indication is provided to an observer when he is in the pseudoscopic regions 22 and 25. Also, an indication which is visible to the observer is provided when he is in the orthoscopic viewing regions 17 and 21. However, in the case of a typical display which is intended to be viewed normally from a central region of the display, the pseudoscopic viewing regions 22 and 25 are typically displaced from the normal to the centre of the display by about 30°. It will therefore be apparent to an observer that such a position is not a correct viewing position for the display. The VPI provides reliable indication of correct orthoscopic viewing in the central orthoscopic region 19 and so permits an observer to avoid the adjacent pseudoscopic viewing regions 23 and 24.

As compared with the previously known VPI arrangement shown in FIGS. 4 and 6(*b*), the arrangement illustrated in FIGS. 5 and 6(*c*) provides an indication with a higher spatial frequency so that the pattern of elements forming the VPI is less visible. In the case of a display which is switchable to a 2D mode of operation, it is possible that the VPI pattern may have some residual visibility in the 2D mode. The present arrangement makes any such artefact less visible. Also, for a given size of VPI, more pixels are illuminated. This results in more light being produced so that the VPI indication in the pseudoscopic regions 23 and 24 is brighter and therefore more effective in warning an observer of incorrect location.

Figure 7:
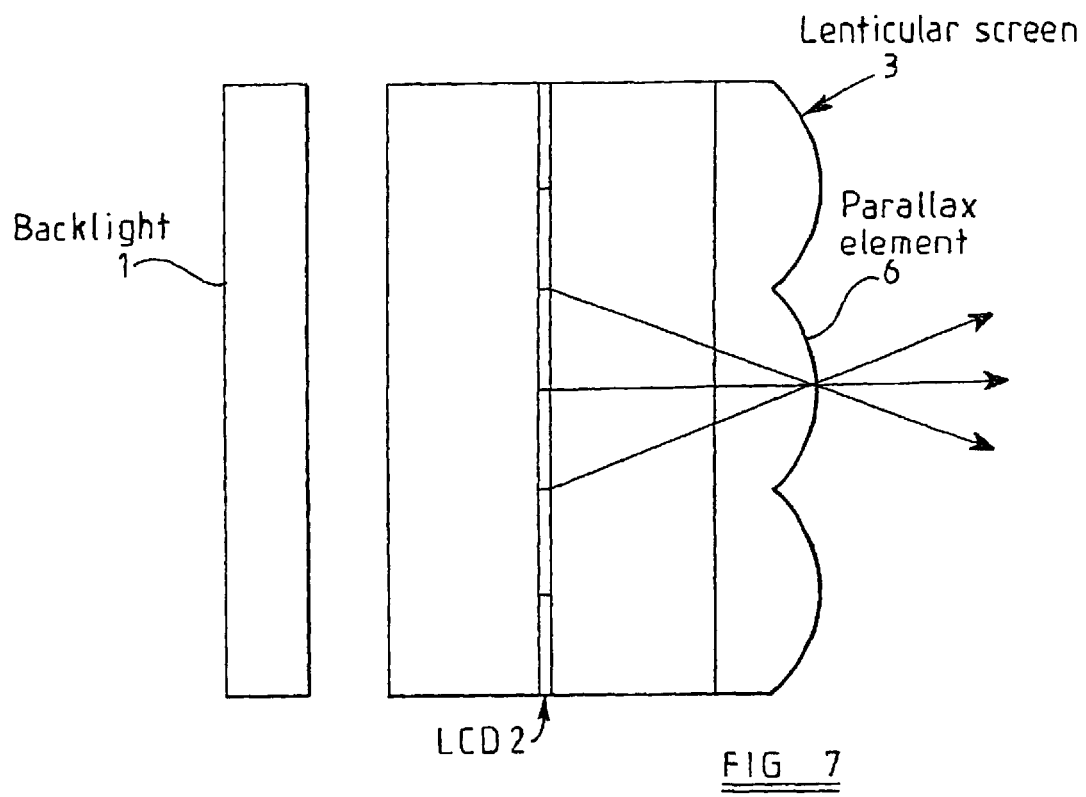
FIG. 7 is a diagrammatic cross-sectional view illustrating a lenticular screen display.
Figure 8:
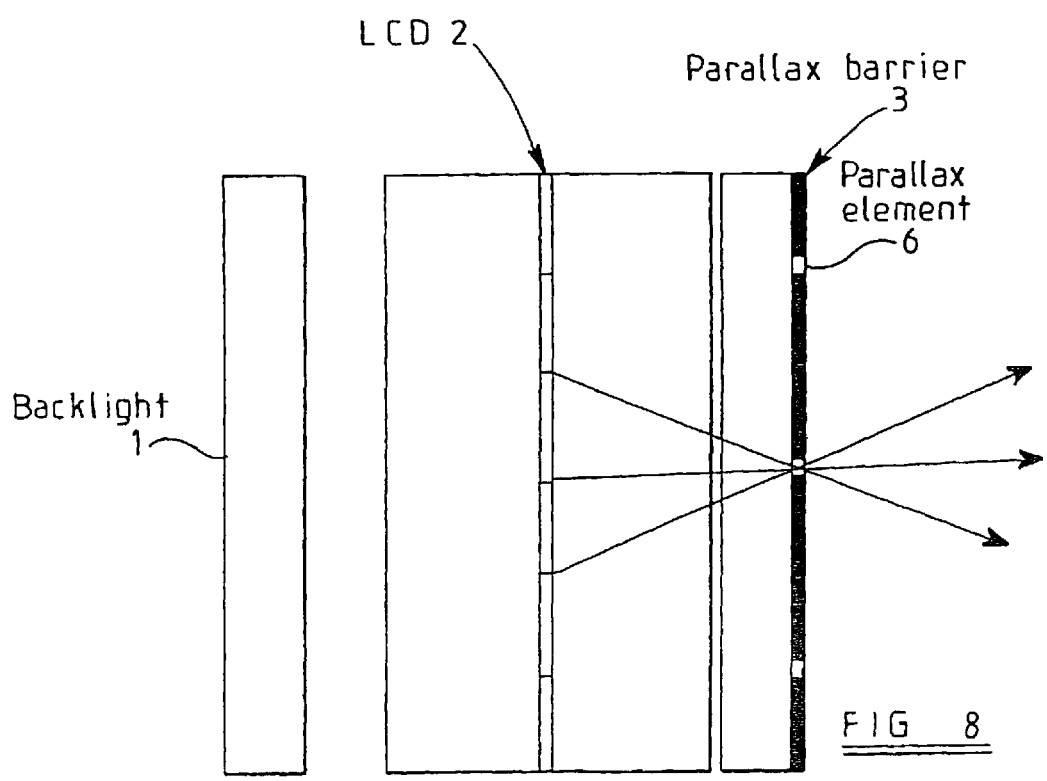
FIG. 8 is a diagrammatic cross-sectional view illustrated a front parallax barrier display.

FIG. 7 illustrates a specific arrangement of the display in which the SLM comprises an LCD 2 and the parallax optic comprises a lenticular screen 3. The arrangement of FIG. 8 differs from that of FIG. 7 in that the lenticular screen 3 is replaced by a parallax barrier constituting the parallax optic. The parallax barrier 3 is illustrated at the output side of the LCD 2 but may alternatively be located between the LCD 2 and the backlight 1, in which case the pitch of the parallax barrier 3 is slightly larger than twice the pitch of the pixel column so as to provide viewpoint correction.

Other forms of parallax optic 3 are possible, such as holographic optical elements.

FIG. 9 illustrates the permissible range of movement of an observer. As described hereinbefore, the display comprising the elements 1, 2 and 3 is of the viewpoint corrected type in which left and right viewing zones 35 and 36 are formed. The display is arranged to form the viewing zones such that the widest lateral extents forming the viewing windows have a pitch substantially equal to the average interocular separation of an observer. Provided the left and right eyes of the observer remain within the viewing zones 35 and 36, respectively, the observer will see the desired 3D image. Lateral or longitudinal observer movement such that at least one eye moves out of its viewing zone will allow the observer to see an undesired image. For instance, as described hereinbefore, lateral movement of the observer in the plane containing the viewing windows leads to pseudoscopic viewing in which the left and right images are seen by the right and left eyes, respectively, of the observer.

The lower part of FIG. 9 illustrates the formation of a viewpoint corrected zone 37 for the viewer position indicating arrangement. Both eyes of an observer must be within the zone 37 in order to see an orthoscopic image. The arrangement of the pixels of the SLM 2 and of the elements 6 and 32 of the parallax optic 3 is such that the zone 37 is laterally and longitudinally aligned with adjacent pair of orthoscopic viewing zones 35 and 36. Provided the observer remains within the dark zone 37 such that no light from the viewer position indicating arrangement is visible to either eye, the observer will be in the central orthoscopic viewing zone intended for use. If the observer moves outside the dark zone 37 as a result of lateral or longitudinal movement or both relative to the display 1, 2 and 3, light will be visible to the observer.

For instance, the near point 38 and the far point 39 are shown in FIG. 9 and represent the closest and furthest orthoscopic viewing positions of the observer. Movement nearer to or further from the display will result in the observer moving outside the zone 37 and seeing light from the viewer position indicating arrangement. As shown in the upper part of FIG. 9, such movement would take the observer outside the intended orthoscopic viewing zone. Accordingly, the viewer position indicating arrangement provides an unambiguous indication to the observer of any movement outside the intended central orthoscopic viewing zone. As the observer moves further away from the intended orthoscopic viewing zones, more light is seen over the area of the viewer position indicating arrangement. This therefore assists the observer to position himself correctly for orthoscopic viewing of the 3D image.

By using different parts of the SLM 2 and the parallax optic 3 to provide the viewer position indicating arrangement, such an arrangement may be provided without increasing the bulk of the autostereoscopic display and with little or no additional cost. No alignment step during manufacture is required for the viewer position indicating arrangement to be aligned with the rest of the display because alignment is guaranteed subject to tolerances in the SLM 2 and the parallax optic 3 individually. Similarly, misalignment cannot occur during use of the autostereoscopic display. Further, substantially the same viewing performances of the display part and the viewer position indicating arrangement part are provided. Thus, aberrations, defocus, scatter and other effects which degrade viewing window quality similarly affect the performance of the viewer position indicating arrangement. The position indication is provided within the area of the display and so is readily visible to an observer.

The viewer position indicating arrangement does not require additional power or connections. Further, it can readily be incorporated in small hand held devices or in laptop type displays.

FIG. 10 illustrates different possible positions for a strip-shaped viewer position indicating arrangement 42. The arrangement may comprise a horizontal strip located at the top of the display as described hereinbefore and illustrated in the upper left part of FIG. 10. The upper right part of FIG. 10 illustrates an alternative position at the bottom of the display. The lower left part of FIG. 10 illustrates vertical strips at opposite sides of the display. The lower right part of FIG. 10 illustrates an arrangement which combines the upper and lower horizontal strips and the vertical strips at opposite sides. The preferred arrangement is a horizontal strip as illustrated at the upper left and right parts of FIG. 10 so as to provide the observer with maximum awareness of the onset of a poor viewing position. The strip 42 will illuminate at different points along its width if the observer is not at the plane of the viewing windows as described hereinafter.

FIG. 11 illustrates a laptop computer 60 having a display in the form of an autostereoscopic display as described hereinbefore. The display includes a parallax optic 3 in the form of a parallax barrier of the type illustrated in FIG. 5. The upper part of FIG. 11 illustrates use of the display in the autostereoscopic 3D mode. The parallax barrier is disposed in an attachment 61 so as to be in correct registration with the pixels of the SLM within the display. For instance, the barrier may be made on a glass or acrylic substrate whose coefficient of thermal expansion is sufficiently close to that of the glass of the LCD forming the SLM. The barrier apertures can be manufactured from an exposed and developed photographic emulsion. Such an exposure can be produced with 0.1 µm tolerances using a flat bed laser scanning apparatus.

The lower part of FIG. 11 illustrates a 2D mode of operation in which the parallax barrier 3 is removed from the attachment 61 and, for instance, stored in a suitable receptacle or pouch at the back of the display. This allows the full spatial resolution of the SLM to be used in the 2D mode.

Other arrangements are possible for permitting the parallax barrier to be removed or disabled for the full resolution 2D mode. For instance, the barrier may be hinged to the top of the display or may be on a roller blind which can be pulled down in front of the SLM 2 when required. Alternatively, an array of half waveplate 90 degree polarisation rotators, which may be half waveplates, may be provided, for instance by patterning onto a layer which can be attached to an output polariser of the SLM 2 or on a separate sheet which is mounted near to the output polariser and aligned with the display. In the 2D mode, this is not visible. However, by disposing an additional polariser in front of the display, areas having 90 degree rotators transmit light whereas those without such rotators extinguish light to form the parallax barrier. The additional polariser is not required to be patterned so that its alignment with the display is less critical. Such a polarising layer can be made more robustly than a removable parallax barrier and is not affected by thermal expansion differences. Alignment tolerances are significantly reduced compared with alignment of the barrier itself.

Figure 12A:
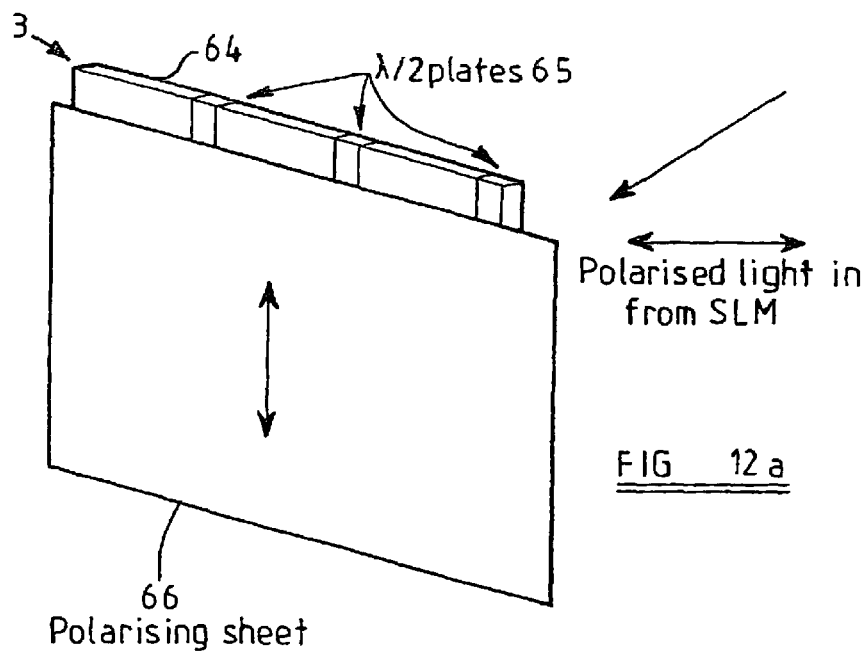
FIG. 12a illustrates a first arrangement for switching between 3D and 2D modes.

An arrangement of this type is shown in FIG. 12a. The parallax optic 3 comprises a substrate having portions 64 which do not affect polarisation and strip-shaped portions 65 which act as half waveplates. In the 3D mode, a linearly polarising sheet 66 is disposed over the substrate. Polarised light from the SLM 2 passes through the regions 64 unchanged but the light passing through the half waveplates 65 has its polarisation vector rotated by 90 degrees. The polarising direction of the polarising sheet 66 is perpendicular to the direction of polarisation of the incoming light so that light passing though the regions 64 is extinguished whereas light passing though the half waveplates 65 is transmitted. When the display is required to operate in the full resolution 2D mode, the polarising sheet 66 is removed so that all light from the SLM 2 is transmitted.

90 degree rotators, such as half waveplates, tend to be optimised for a particular wavelength. Thus, in the 3D mode, light transmitted through the slits may become slightly coloured. Single layer retarder elements may be appropriate for this application but chromatic performance may be improved by using multi-layer retarder structures. Any light transmitted through the regions between the slits would result in undesirable image crosstalk. However, no polarisation modification is used in the regions between the slits so that most of the light is absorbed by the polarising sheet 66 which may have good broadband absorption properties. Accordingly, display crosstalk can be minimised.

Figure 12B:
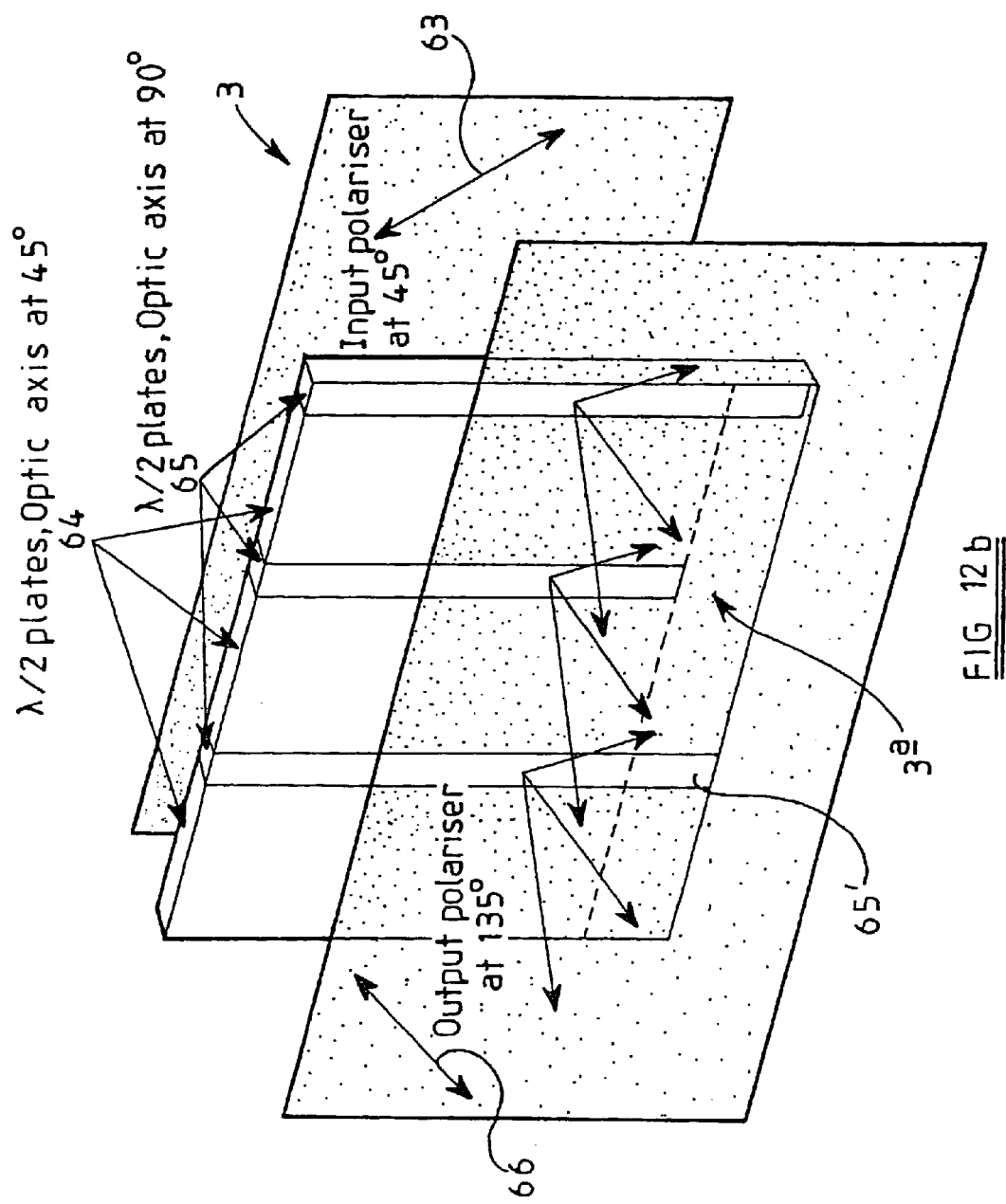
FIG. 12b illustrates a second arrangement for switching between 3D and 2D modes.

FIG. 12b illustrates an arrangement of a type similar to that shown in FIG. 12a. However, the portions 64 and 65 all comprise half waveplates, but with their optic axes differently aligned. An input polariser 63 is shown with its polarising axis 45° to a reference direction (horizontal). The input polariser 63 is generally constituted by an output polariser of the SLM 2 when embodied as an LCD. The optic axes of the portions 64 are aligned at 45° and are therefore parallel to the polarisation vector of light from the input polariser. The portions 64 thus have substantially no effect on the polarisation so that light passing through the portions 64 is absorbed by the output polariser 66, whose polarising axis is aligned at 135°.

The optic axes of the portions 65 are aligned at 90° so that the polarisation vector of light passing though the portions 65 is changed to 135° and is transmitted by the output polariser. Thus, with the output polariser in place, a parallax barrier is formed to provide 3D viewing. By removing the output polariser from the optical path, a full resolution 2D mode is provided.

Alternate ones of the portions 65 are extended downwardly as shown at 65' to form the barrier portion 3a in the 3D mode to provide the viewer position indication. However, when the output polariser is removed, the whole of the SLM is available for displaying 2D images.

Figure 13:
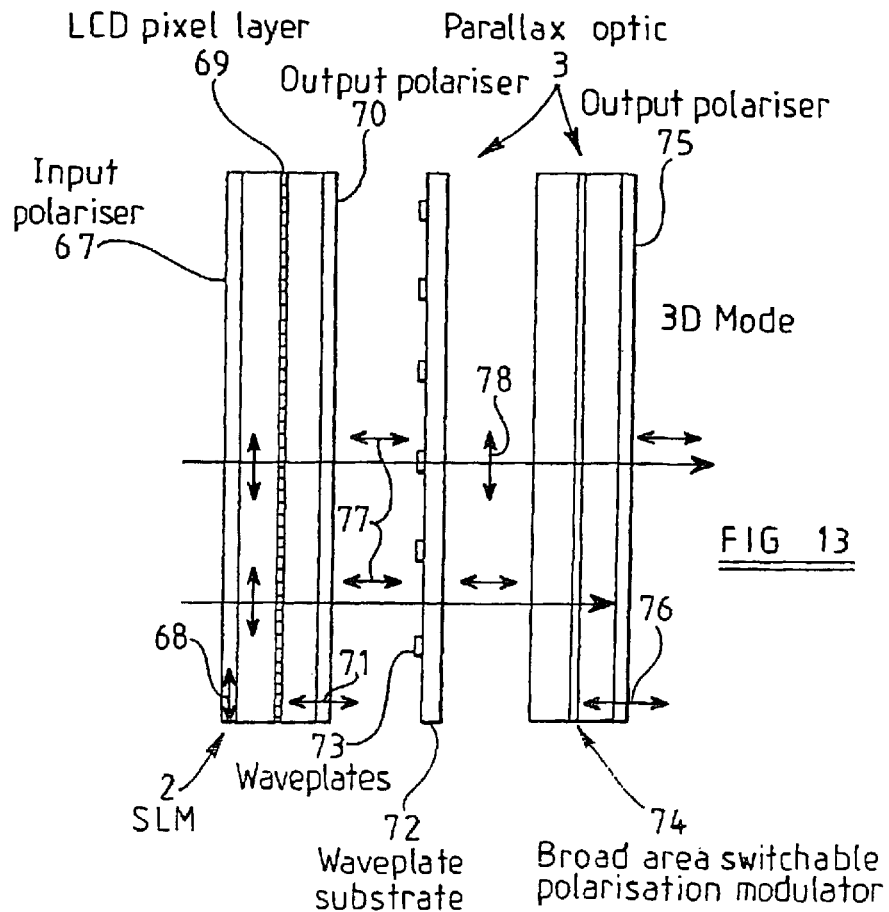

FIG. 13 illustrates another arrangement for switching between 3D and 2D modes. The SLM 2 comprises an LCD comprising an input polariser 67 having a polarisation direction illustrated by a double headed arrow 68, a liquid crystal pixel layer 69, and an output polariser 70 having a polarisation direction indicated by a double headed arrow 71. A waveplate substrate 72 is disposed adjacent the output polariser 70 and comprises a transparent substrate carrying strip-shaped half waveplates 73. The substrate 72 forms part of the parallax optic 3 which also comprises a broad area switchable polarisation modulator 74 and an output polariser 75 having a polarisation direction indicated by the double headed arrow 76.

In the 3D mode illustrated in FIG. 13, output light from the SLM 2 is polarised in the direction indicated by the double headed arrows 77. Light passing though the waveplates 73 has its polarisation direction rotated by 90 degrees so as to be in the direction indicated by the double headed arrow 78. Light passing though the substrate 72 between the waveplates 73 is unaffected. The polarisation modulator 74, which may for instance comprise a twisted nematic cell or pi cell, is controlled so as to have no effect on polarisation so that the output polariser 75 passes light with the polarisation 78 but extinguishes light with the polarisation 77. The parallax optic 3 therefore functions as a parallax barrier.

FIG. 14 illustrates operation in the full resolution 2D mode. In this mode, the active layer 79 of the polarisation modulator 74 is controlled so as to rotate the polarisation of incoming light by 45 degrees. The active layer 79 may achieve this by rotating the polarisation by 45 degrees or by applying a quarter wave phase shift. Thus, light from all parts of the substrate 72 including the waveplates 73 is incident on the output polariser 75 with a polarisation direction at 45 degrees to the polarising axis 76 of the polariser 75 or with circular polarisation. Accordingly, the output polariser 75 transmits light from all regions of the substrate 72 with substantially the same relatively low attenuation and the parallax optic effectively disappears.

In the arrangements described hereinbefore, some of the rows of pixels of the SLM 2 are used to provide position indication. This results in some loss of resolution and image size of the 3D image. However, this may be regained by providing additional pixels specifically for position indication and, for instance, only capable of being switched between a colour and black. Alternatively, time multiplexing between the 3D image and the position indicator may be possible. The processing electronics requirement associated with such pixels is small so that driver cost need not be substantially affected. Because the data for such pixels are fixed for each mode of operation, devices such as thin film transistors would not be necessary for controlling these pixels.

Figure 15:
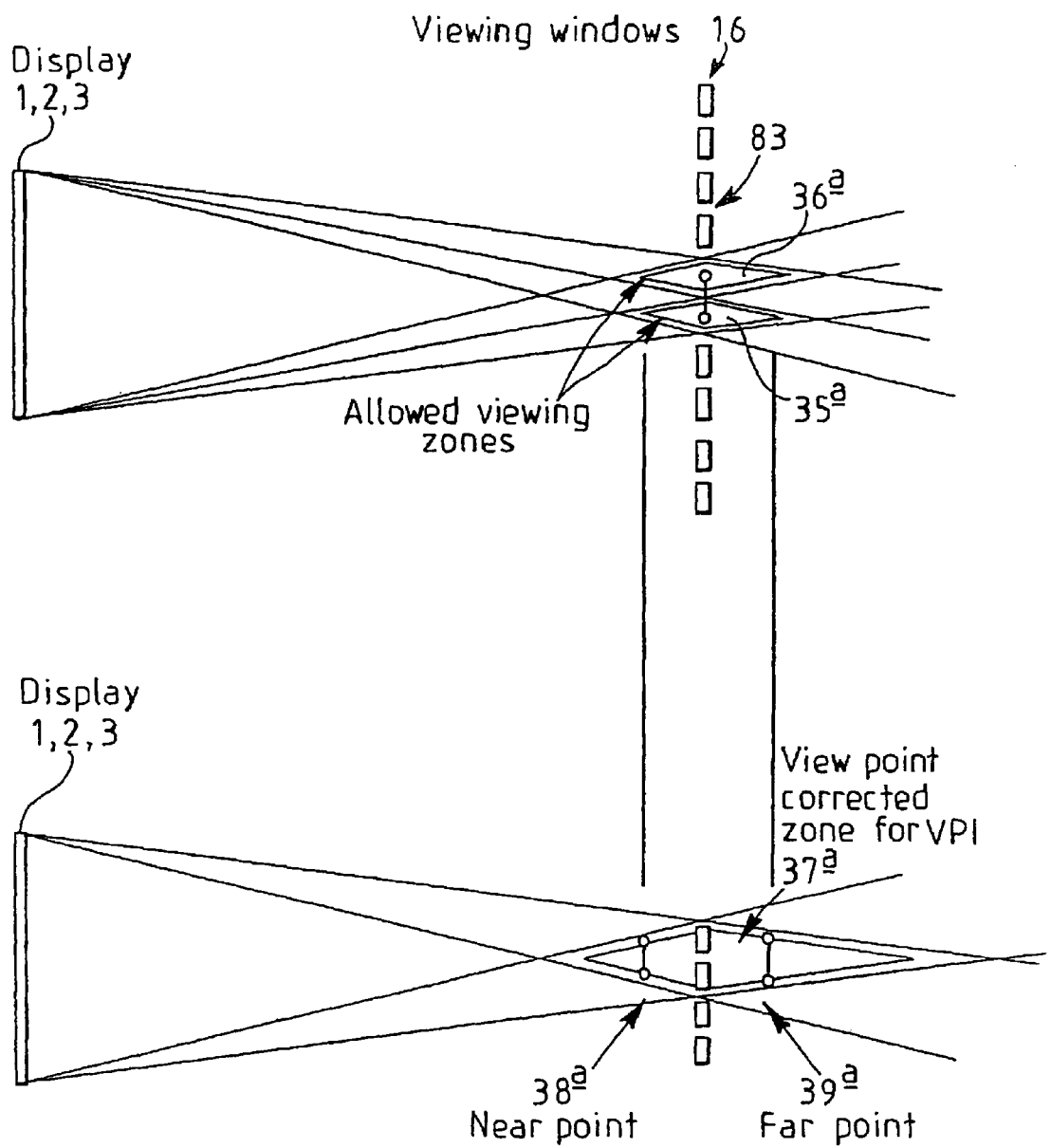
FIG. 15 is a view similar to FIG. 9 illustrating the effect of pixel columns laterally separated by continuous strips of a black mask.

FIG. 15 illustrates the effect of using an SLM 2 having pixels arranged in columns but with the columns laterally separated by continuous vertical strips of a black mask of the SLM. The upper part of FIG. 15 illustrates that the viewing windows 16 are no longer laterally contiguous but are separated by vertical strips such as 83 where the vertical black mask strips are imaged. Thus, the allowed viewing zones 35a and 36a are more spatially restricted than the viewing zones 35 and 36 shown in FIG. 9. However, as shown in the lower part of FIG. 15, the same effects are present in the viewer position indicating arrangement such that a reduced viewpoint corrected zone 37a having near and far points 38a and 39a closer to the plane of the viewing windows is produced. The reduced zone 37a corresponds to the reduced zones 35a and 36a so that correct viewer position indication is given for this embodiment.

All of the pixels in the viewer position indicating arrangement may be used to generate the illuminated windows for providing viewer position indication. Accordingly, a relatively bright indication may be provided.

Figure 16:
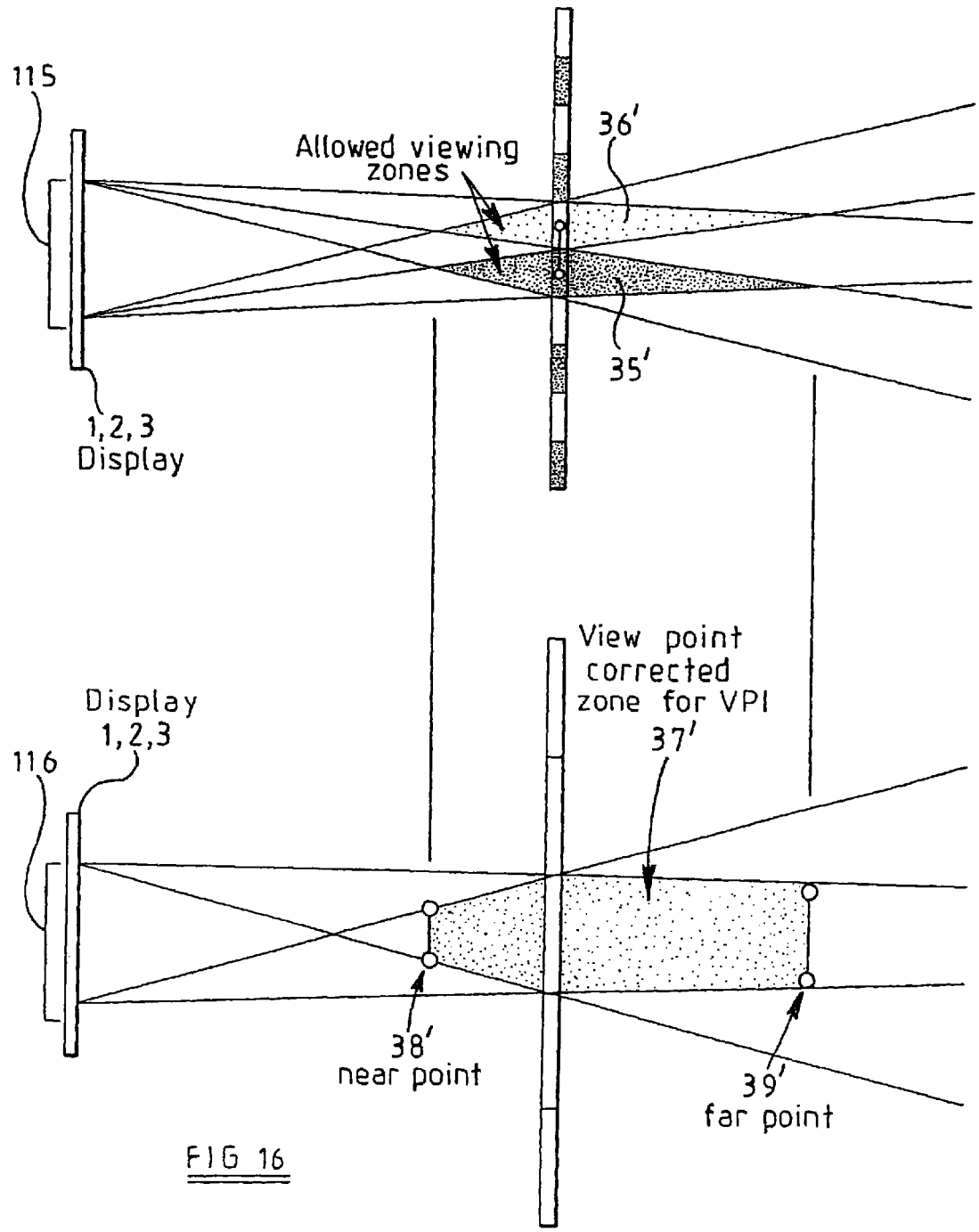
FIG. 16 is a view similar to FIG. 9 but illustrating increased longitudinal viewer freedom resulting from reduced lateral extent of a displayed 3D image.

As described hereinbefore, FIG. 9 illustrates the longitudinal viewing freedom when the display 1,2,3 displays a full width 3D image. However, the longitudinal extent of the viewing zones is increased when the lateral size of the 3D image is less than the width of the display 1, 2, 3. This is illustrated in FIG. 16, in which the 3-D image is laterally restricted as shown at 115, such that the viewing zones 35' and 36' are substantially longer. In this case, the new near point 38' is nearer the display 1, 2, 3 than the near point 38 shown in FIG. 9. Similarly, the new far point 39' is further from the display 1, 2, 3 than the far point 39 shown in FIG. 9.

In order to provide a correct indication to the viewer of the increased longitudinal freedom of movement, the part of the display providing the viewer position indication may be made black in all areas which are laterally outside the lateral extent 115 of the 3D image. Thus, as shown in FIG. 16, only the portion 116 of, for instance, the pixels providing the viewer position indication are used. This results in the view point corrected zone 37' matching the viewing zones 35' and 36' as shown in FIG. 16. Thus, the zone 37' has the same longitudinal viewing freedom as the displayed image.

Figure 17:
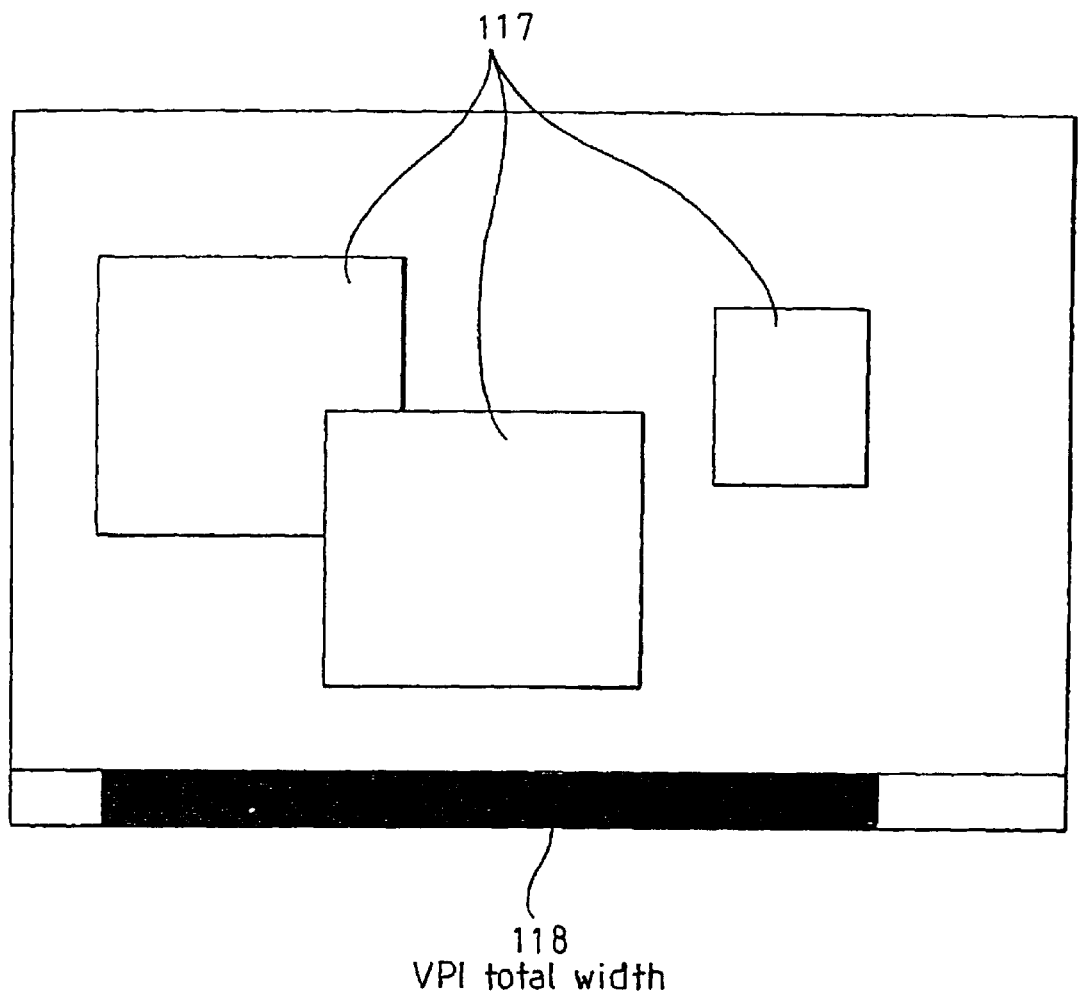
FIG. 17 illustrates the appearance of a display when operating as illustrated in FIG. 16.

The lateral extent 115 of the 3D image or all of the 3D images where more than one is being displayed can be determined by a controller for controlling the image display and can be supplied to viewing position indication width calculating routines, so that the lateral portion 116 of the active indication matches the total lateral extent of the displayed 3D image. As illustrated in FIG. 17, the display 1, 2, 3 may have several regions 117 in which 3D images are being displayed. In order to provide the correct indication of viewing freedom, the total width of the active part of the display providing the viewer position indication is as shown at 118. The active part extends continuously from the lateral position of the left hand most boundary of the 3D images to the first hand most boundary. Thus, optimum viewing freedom of the display can be achieved for all images.

The invention has been described above with reference to a display incorporating a transmissive spatial light modulator. It may also be applied to a display incorporating a trans-reflective spatial light modulator.

What is claimed is:

1. An autostereoscopic display comprising an image display, a signal display, and a parallax optic having a first portion, which cooperates with said image display to form a plurality of right and left eye viewing zones in a viewing region, and a second portion, which cooperates with said signal display to form a first signal image which is visible in at least one first part of said viewing region and a second signal image which is visible in at least one second part of said viewing region, said first portion comprising an array of parallax elements having a first pitch in a first direction, and said second portion comprising an array of parallax elements having a second pitch substantially equal to one and a half times said first pitch in said first direction.

2. A display as claimed in claim 1, in which said at least one first part comprises an orthoscopic viewing zone.

3. A display as claimed in claim 2, in which said at least one second part comprises pseudoscopic viewing zones adjacent said orthoscopic viewing zone.

4. A display as claimed in claim 1, in which one of said first and second signal images is a bright image and another of said first and second signal images is a dark image.

5. A display as claimed in claim 1, in which said first signal image is of a first colour and said second signal image is of a second colour different from said first colour.

6. A display as claimed in claim 1, in which said image display and said signal display comprise first and second portions, respectively, of a common display.

7. A display as claimed in claim 6, in which said common display comprises a light source and one of a light-transmissive and a trans-reflective spatial light modulator.

8. A display as claimed in claim 7, in which said spatial light modulator comprises a liquid crystal device.

9. A display as claimed in claim 1, in which said image display and said first portion cooperate to form said viewing zones in a plurality of lobes with two of said viewing zones per lobe.

10. A display as claimed in claim 1, in which said parallax optic comprises a lens array.

11. A display as claimed in claim 10, in which said lens array comprises a lenticular screen.

12. A display as claimed in claim 1, in which said parallax optic comprises an array of holographic optical elements.

13. A display as claimed in claim 1, in which said parallax optic comprises a parallax barrier.

14. A display as claimed in claim 13, in which said first portion of said parallax barrier comprises a plurality of slits of a first width and said second portion of said parallax barrier comprises a plurality of slits of the first width.

15. A display as claimed in claim 13, in which said first portion of said parallax barrier comprises a plurality of slits of a first width and said second portion of said parallax barrier comprise a plurality of slits of a second width less than said first width.

16. A display as claimed in claim 13, in which said parallax barrier comprises a plurality of parallax elements and alternate ones of said parallax elements of said second portion are aligned in a second direction substantially perpendicular to said first direction with respective ones of said parallax elements of said first portion.

17. A display as claimed in claim 1, in which said parallax optic is removable for a non-autostereoscopic display mode.

18. A display as claimed in claim 13, in which said parallax barrier comprises a first layer and a removable second layer, said first layer comprising barrier regions for supplying light having a first polarisation and aperture regions for supplying at least light having a second polarisation which is substantially orthogonal to said first polarisation, said second layer comprising a polariser for passing light of said second polarisation.

19. A display as claimed in claim 18, in which said image display and said signal display are arranged to supply light of said first polarisation, said barrier regions are arranged to pass light of said first polarisation, and said aperture regions are arranged to convert light of said first polarisation at least partially to light of said second polarisation.

20. A display as claimed in claim 19, in which said first layer is a half waveplate, said barrier regions have optic axes parallel to said first polarisation and said aperture regions have optic axes aligned at 45° to said first polarisation.

21. A display as claimed in claim 1, in which said signal display is arranged to be active throughout a lateral extent corresponding to a lateral extent of each three dimensional image displayed by said image display.

* * * * *